United States Patent
Chen et al.

(10) Patent No.: US 12,519,510 B2
(45) Date of Patent: Jan. 6, 2026

(54) DATA DETECTION SOLUTION FOR NOMA-BASED UPLINK CELL-FREE MIMO NETWORKS

(71) Applicants: MEDIATEK INC., Hsinchu (TW); National Taiwan University, Taipei (TW)

(72) Inventors: Ti-Yu Chen, Hsinchu (TW); Tzi-Dar Chiueh, Taipei (TW); Chia-Hao Yu, Hsinchu (TW)

(73) Assignees: MEDIATEK INC., Hsinchu (TW); National Taiwan University, Taipei (TW)

( * ) Notice: Subject to any disclaimer, the term of this patent is extended or adjusted under 35 U.S.C. 154(b) by 5 days.

(21) Appl. No.: 18/613,377

(22) Filed: Mar. 22, 2024

(65) Prior Publication Data
US 2024/0348295 A1    Oct. 17, 2024

Related U.S. Application Data

(60) Provisional application No. 63/495,780, filed on Apr. 13, 2023.

(51) Int. Cl.
*H04B 7/0413* (2017.01)
*H04B 7/08* (2006.01)

(52) U.S. Cl.
CPC ......... *H04B 7/0413* (2013.01); *H04B 7/0854* (2013.01)

(58) Field of Classification Search
CPC .......................... H04B 7/0854; H04B 7/0413
See application file for complete search history.

(56) References Cited

U.S. PATENT DOCUMENTS

2023/0328536 A1*  10/2023  Al-Eryani ............ H04W 16/18
                                                                           455/446

* cited by examiner

*Primary Examiner* — Rahel Guarino
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus implements a user equipment (UE) node representing a UE in a cell-free multiple-input multiple-output (MIMO) network. The UE node receives a plurality of probability estimates for a plurality of possible symbols transmitted by the UE from a plurality of access point (AP) nodes. The UE node aggregates the plurality of probability estimates from the plurality of AP nodes to obtain a system-level probability estimate. The UE node generates an updated plurality of probability estimates for the plurality of possible symbols based on the system-level probability estimate. The UE node transmits the updated plurality of probability estimates to the plurality of AP nodes.

20 Claims, 17 Drawing Sheets

1500

Algorithm 1 The Proposed DMPACT Detector

1: Input: $\hat{h}_l, y, \sigma_l^2$
2: Initialization: $I_{\eta \to v_k}^{log}(x_k) = 0, U = \{1, ..., K\}$
3: for $l = 1, ..., L$ do
4:　　$R(l) \leftarrow$ The $K_{max}$ UEs with the largest $|\hat{h}_{kl}|$
5: end for
6: Update $V(k)$ according to $R(l)$
7: Apply initial constellation truncation, remove determined UEs from $U$
8: repeat
9:　　repeat
10:　　　for $l = 1, ..., L$ do
11:　　　　Calculate marginal probabilities with (11)
12:　　　　for all $k \in R(l)$ do
13:　　　　　Update probabilities with (8) (9)
14:　　　　end for
15:　　end for
16:　　until Probabilities converge
17:　　Update bit LLRs with (10)
18:　　Remove UEs with all bit LLRs exceeding the threshold from $U$ and $R(l)$
19:　　Apply LLR-based constellation truncation
20:　　for $l = 1, ..., L$ do
21:　　　repeat
22:　　　　$R(l) \leftarrow R(l) \cup \arg\max_{U \setminus R(l)} |\hat{h}_{kl}|$
23:　　　until $|R(l)| \geq K_{min}$
24:　　end for
25:　　Decrease the LLR threshold for faster convergence
26: until All UEs' bit LLR is lower than the threshold
27: Output: $LLR_{k,b}$

FIG. 15

DATA DETECTION SOLUTION FOR NOMA-BASED UPLINK CELL-FREE MIMO NETWORKS

CROSS-REFERENCE TO RELATED APPLICATION(S)

This application claims the benefits of U.S. Provisional Application Ser. No. 63/495,780, entitled "DMPACT: A NEAR-OPTIMAL DATA DETECTION ALGORITHM FOR UPLINK CELL-FREE MIMO NETWORKS" and filed on Apr. 13, 2023, which is expressly incorporated by reference herein in its entirety.

BACKGROUND

Field

The present disclosure relates generally to communication systems, and more particularly, to techniques of data detection in a cell-free multiple-input multiple-output (MIMO) network.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus implements a user equipment (UE) node representing a UE in a cell-free multiple-input multiple-output (MIMO) network. The UE node receives a plurality of probability estimates for a plurality of possible symbols transmitted by the UE from a plurality of access point (AP) nodes. The UE node aggregates the plurality of probability estimates from the plurality of AP nodes to obtain a system-level probability estimate. The UE node generates an updated plurality of probability estimates for the plurality of possible symbols based on the system-level probability estimate. The UE node transmits the updated plurality of probability estimates to the plurality of AP nodes.

In another aspect of the disclosure, a method, a computer-readable medium, and an apparatus are provided. The apparatus implements an AP node representing an AP in a cell-free MIMO network. The AP node obtains a signal received at the AP comprising a combination of signals transmitted by a set of UEs in the cell-free MIMO network. The set of UE nodes representing the set of UEs are connected to the AP node. The AP node estimates, for each UE node connected to the AP node, a probability of each possible symbol transmitted by a UE represented by the UE node based on the received signal. The AP node transmits, to each UE node connected to the AP node, the estimated probabilities of the possible symbols transmitted by the represented UE. The AP node receives, from each UE node connected to the AP node, updated probabilities of the possible symbols transmitted by the represented UE. The AP node adjusts the estimated probabilities of the possible symbols transmitted by each UE of the set of UEs based on the updated probabilities received from the UE nodes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 15 is a diagram listing an exemplary algorithm 1 for the DMPACT (Dynamic MPA with Constellation Truncation) detector used in a cell-free MIMO system.

DETAILED DESCRIPTION

Figure 1:
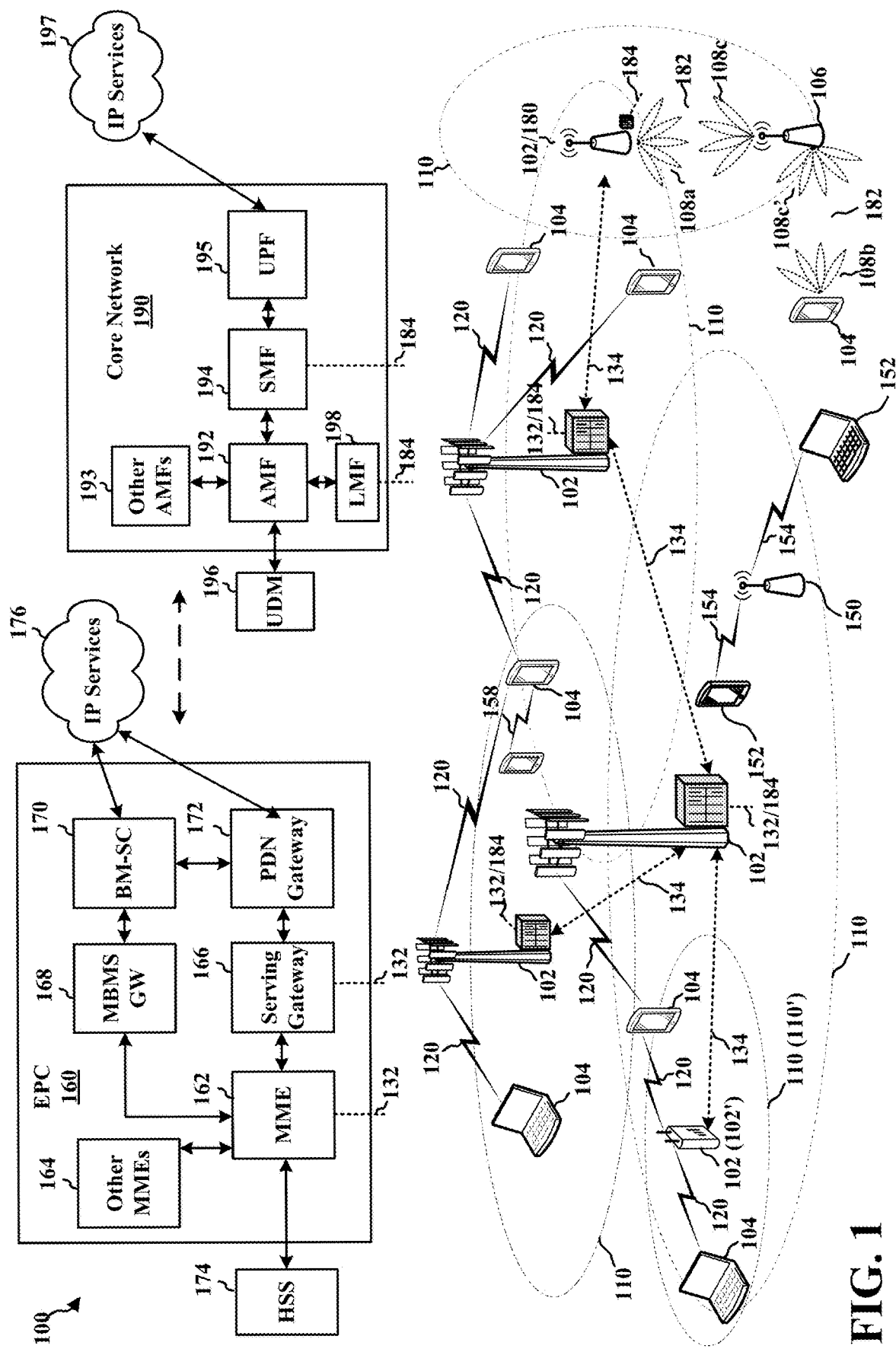
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHZ and 30 GHZ, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (CNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
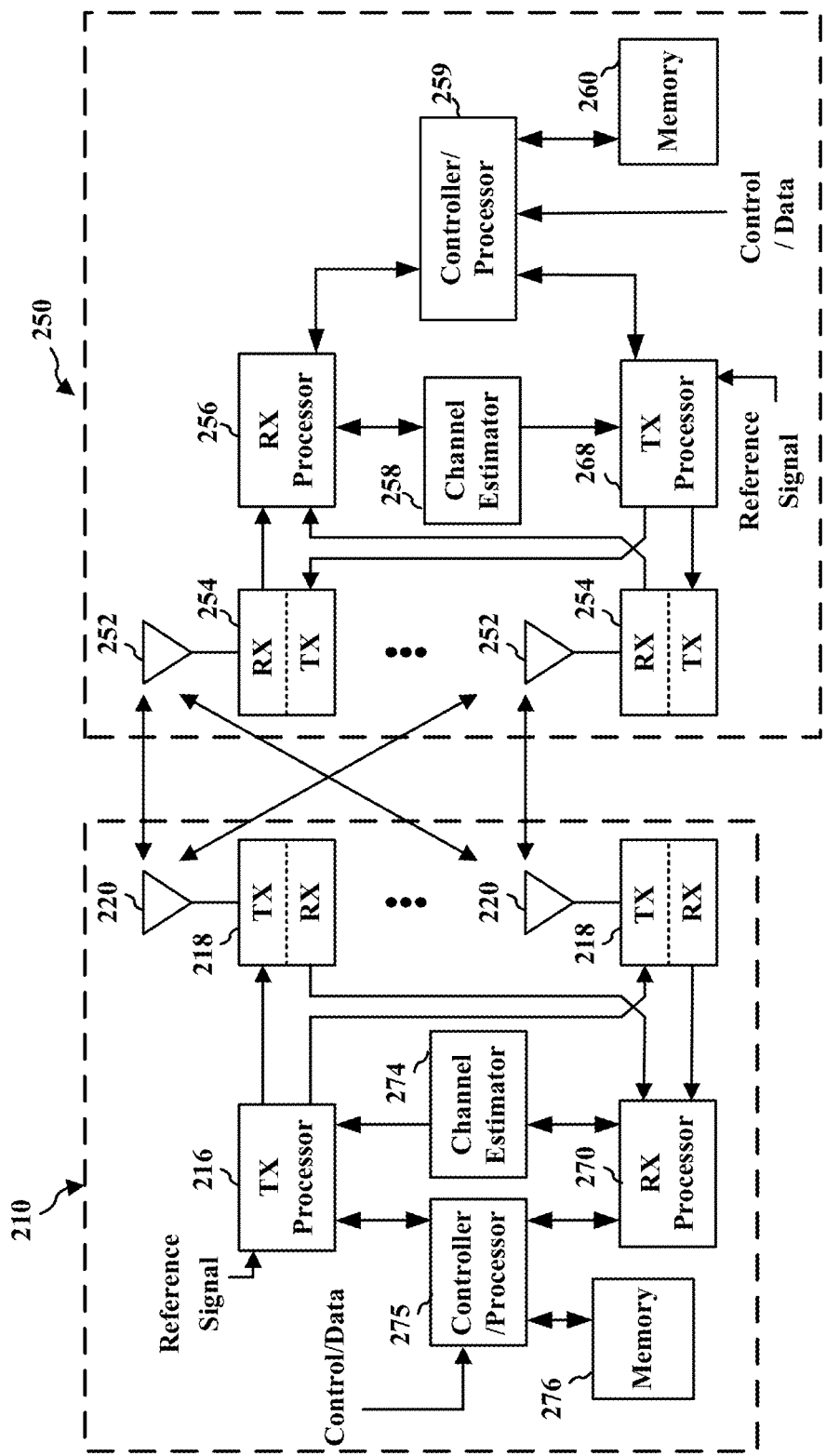
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (cMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
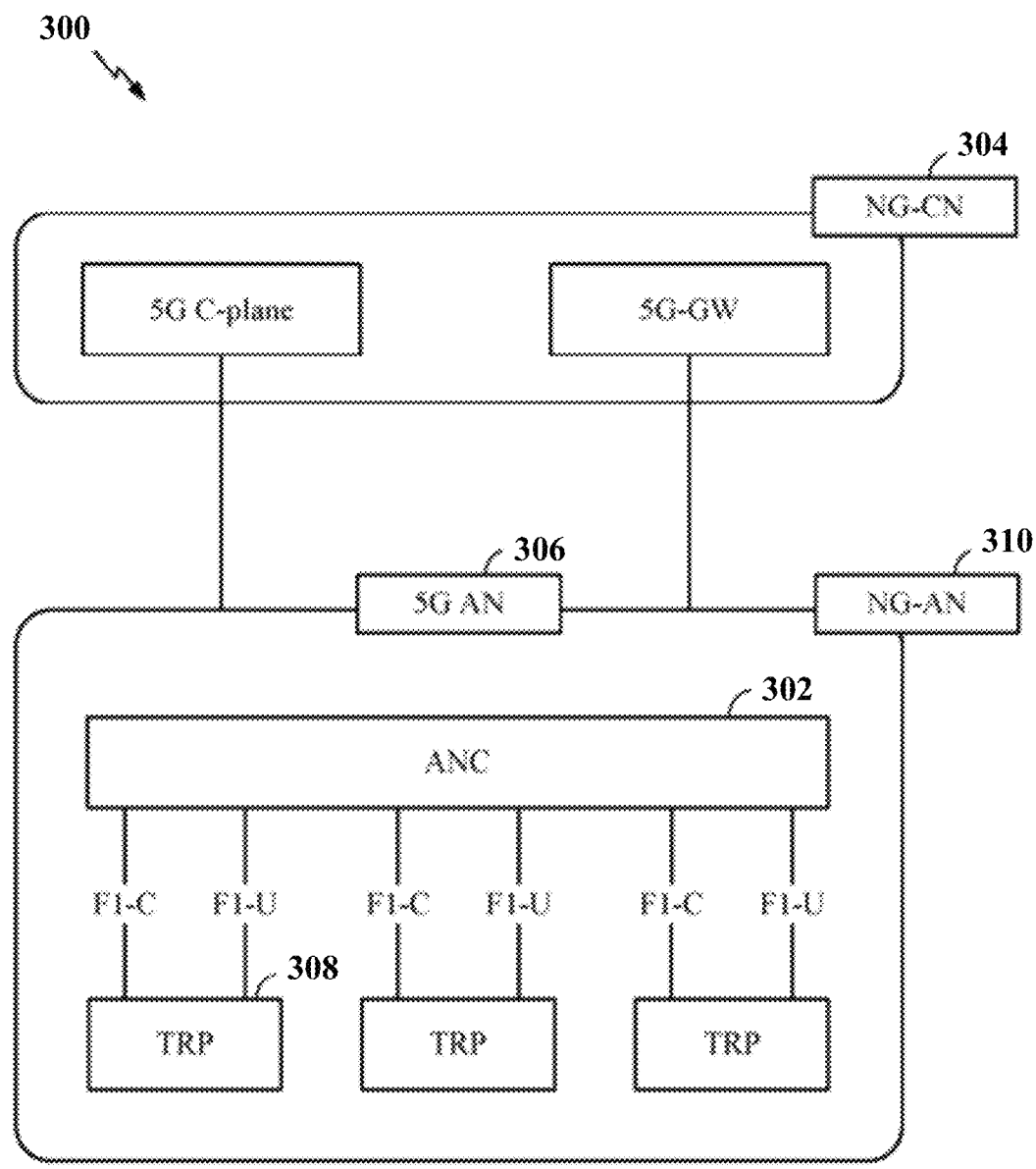
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
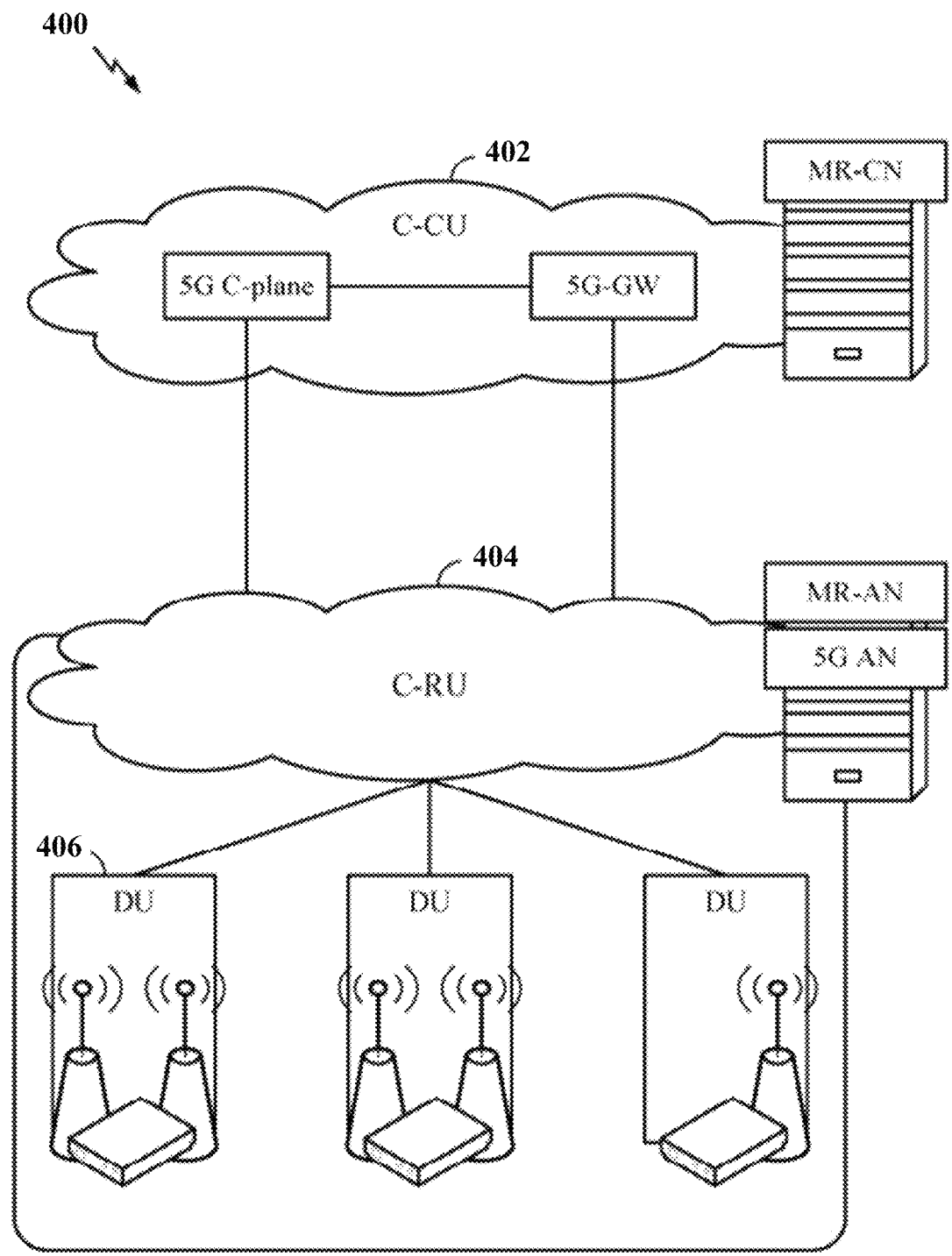
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
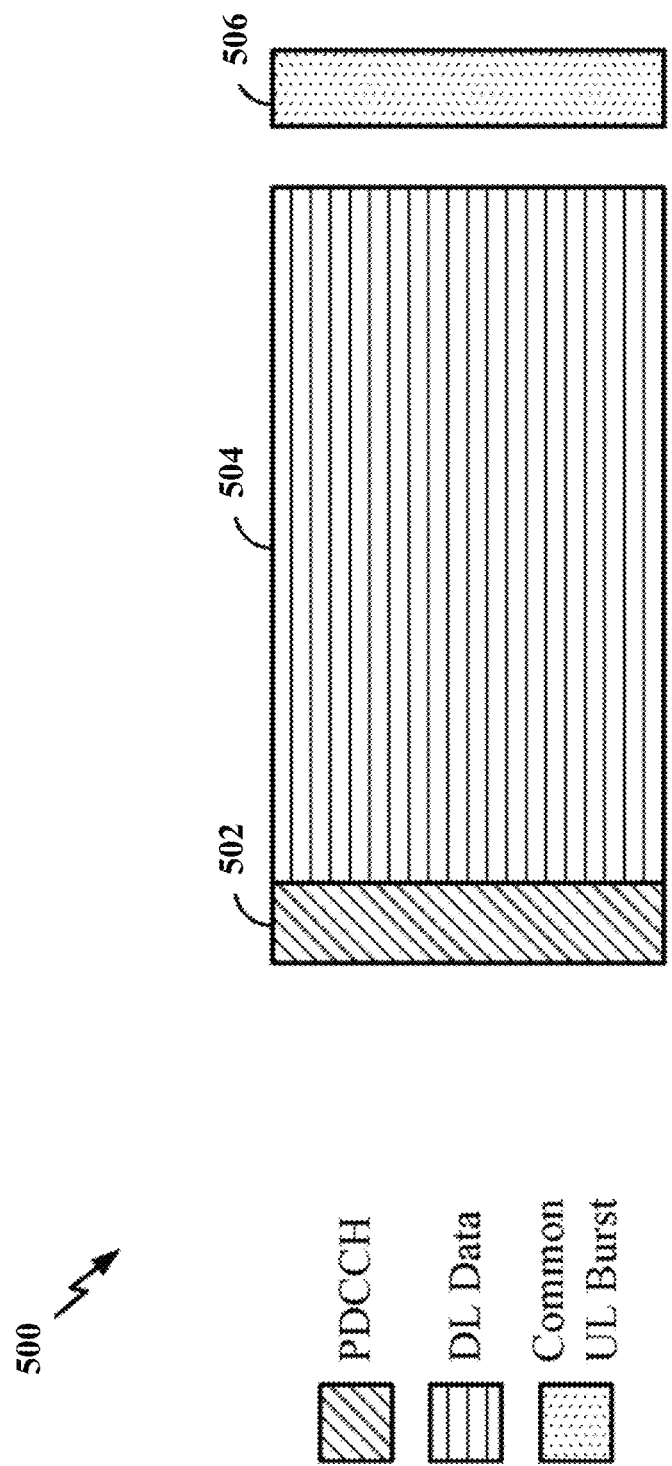
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
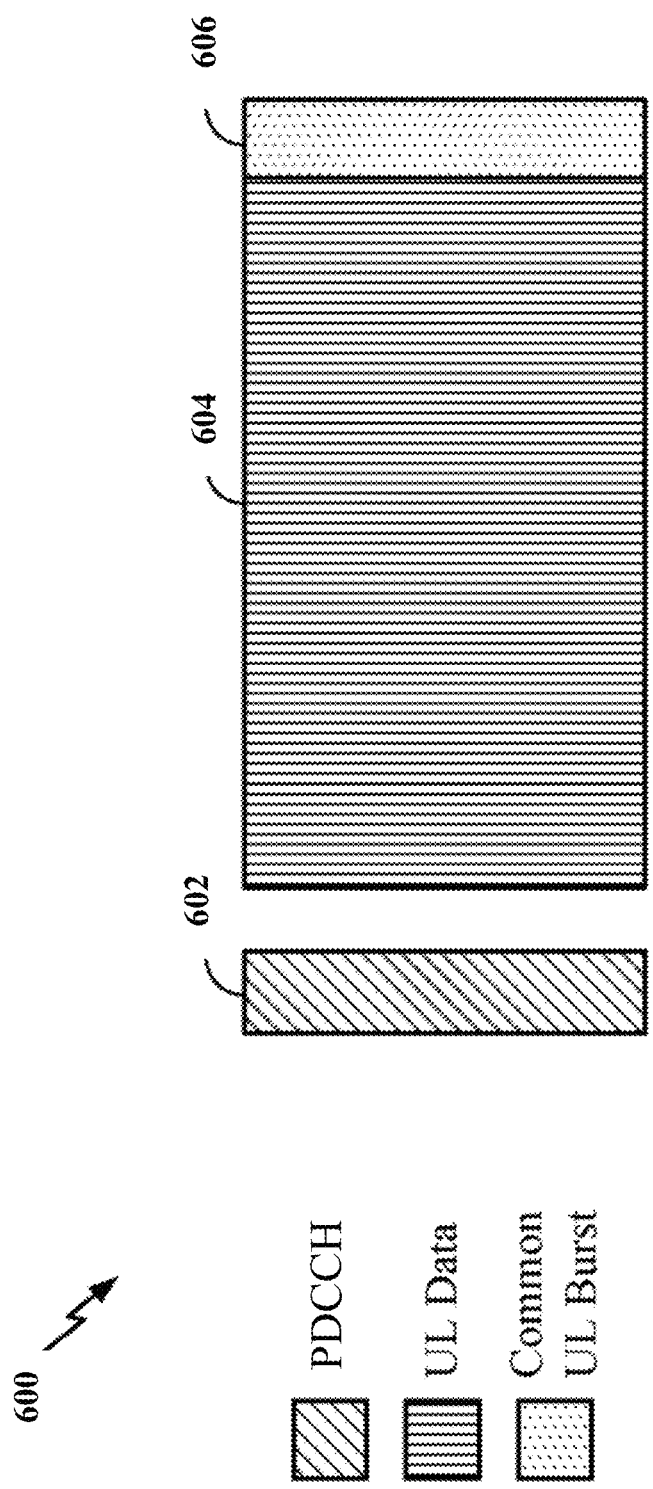
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
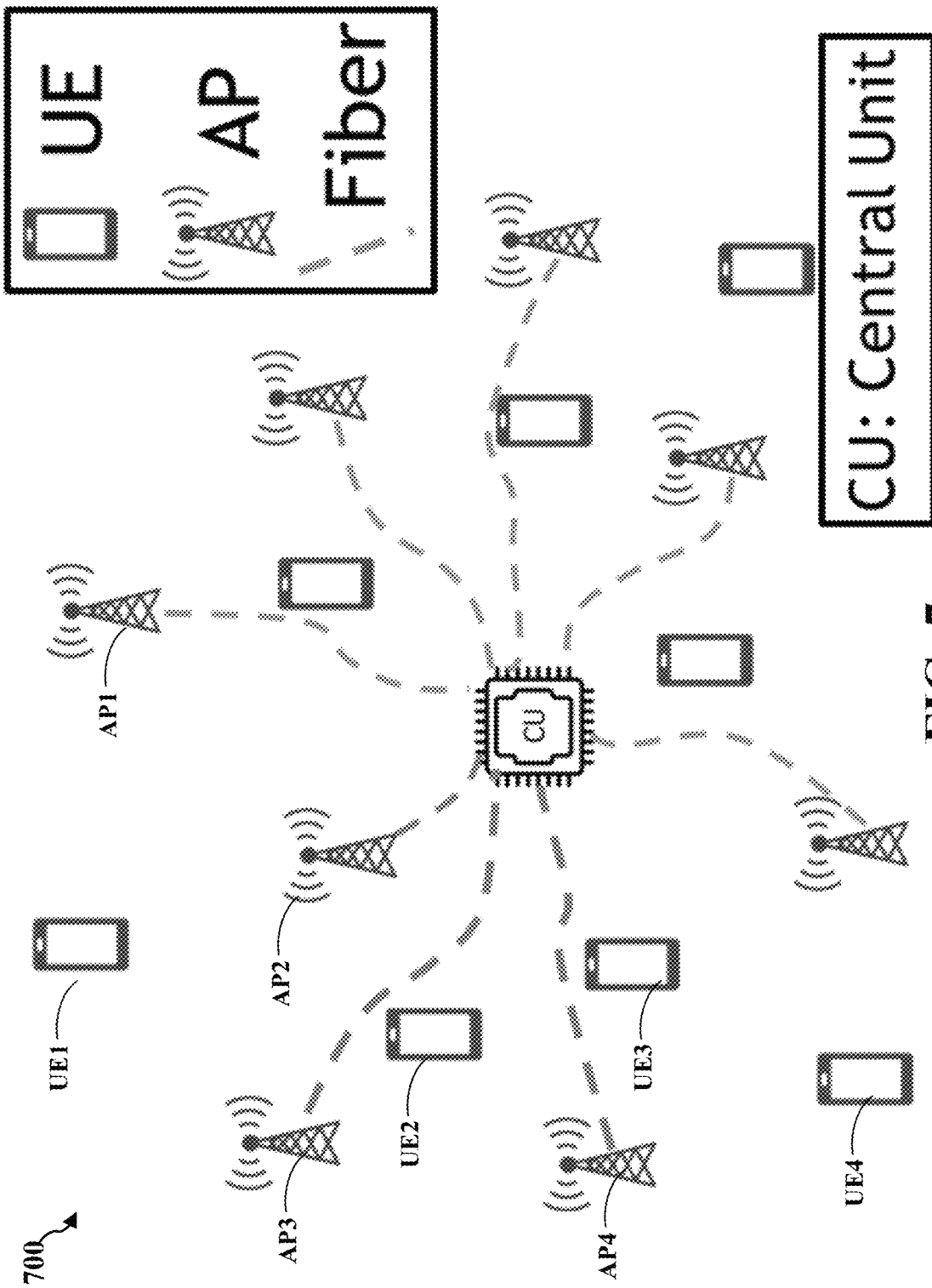
FIG. 7 is a diagram illustrating a cell-free MIMO network architecture comprising multiple UEs (User Equipments) and APs (Access Points).

FIG. 7 is a diagram 700 illustrating a cell-free MIMO network architecture comprising multiple UEs (User Equipments) and APs (Access Points). The APs connect to a Central Unit (CU) via fiber links. In conventional cellular networks, a UE is typically served by a single AP. However, when a UE is located at the intersection of cells formed by multiple APs, its signal quality is poor regardless of which AP it connects to.

To address this challenge, the cell-free network architecture eliminates the constraint of a UE being served by only one AP. In scenarios similar to the one described, where a UE is at the edge of three cells, it can simultaneously receive service from all three APs. This cooperative effort among the APs enhances the Quality of Service (QOS) for UEs located at the cell edges, thereby improving the spectral efficiency of the communication system.

Moreover, the control aspect of the cell-free network architecture, such as the Medium Access Control (MAC) layer, can also adopt this cell-free approach. For instance, when a UE is associated with three APs, it might access the network using a specific MAC or control method, while another UE might utilize a different control method to access the network. If these two UEs overlap in terms of the APs they are associated with, the overlapping AP effectively uses two different configurations to serve the two UEs.

This approach to network architecture, where the traditional cellular grid is removed, is termed "cell-free." It allows for a more flexible and efficient use of the network's spectral resources by enabling multiple APs to cooperate in serving a single UE. This not only enhances the QoS for UEs at the cell edges but also optimizes the overall network performance by leveraging the collective capabilities of multiple APs.

Figure 8:
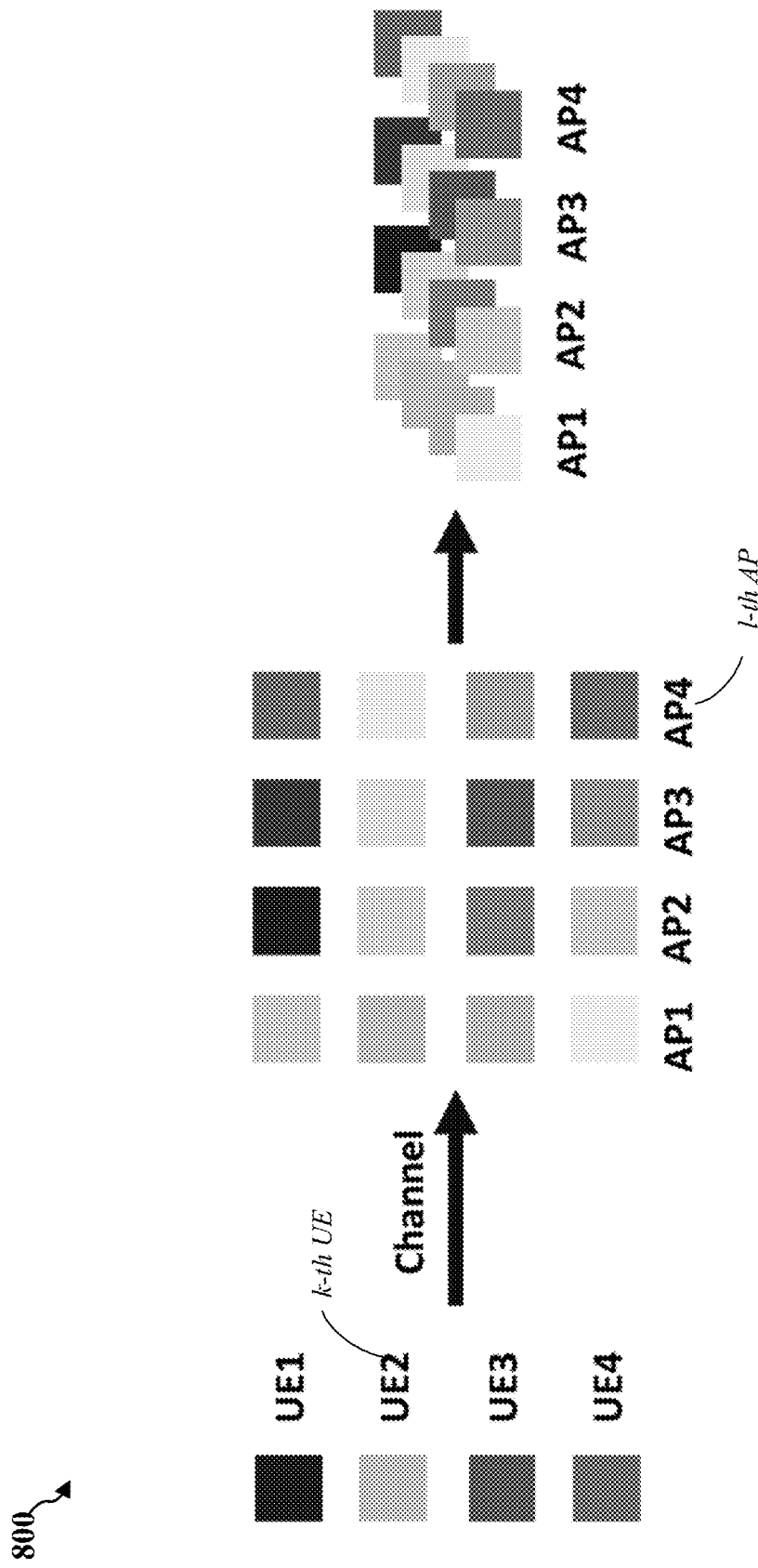
FIG. 8 is a diagram illustrating signal transmission in a cell-free system.

FIG. 8 is a diagram 800 illustrating signal transmission in a cell-free system. In this example, UE1 to UE4 shown in FIG. 7 transmit signals, while AP1 to AP4 receive the signals.

More specifically, the signals from all UEs are transmitted on the same time-frequency resource element during uplink transmission. In other words, at the $l^{th}$ AP, the data symbols from all K UEs are summed together as shown in the below equation:

$$y_l = \sum_{k=1}^{K} \sqrt{p_k} h_{kl} x_k + n_l \tag{1}$$

where $y_l$ is the signal received at the $l^{th}$ AP, $p_k$ is the transmission power of the $k^{th}$ UE, $h_{kl}$ is the channel coefficient from the $k^{th}$ UE to the $l^{th}$ AP, $x_k$ is the symbol transmitted by the $k^{th}$ UE, and $n_l$ is the noise at the $l^{th}$ AP. This model demonstrates that the signal received at any AP is a summation of the signals from all UEs, adjusted for their respective channel conditions and transmission power, plus noise.

With K UEs accessing the network simultaneously, the signal received at the $l^{th}$ AP is the sum of the data symbols from all K UEs plus noise n. By treating the channel vector h, which represents the channel from each UE to every AP, as a codebook, this signal model can be seen as a code domain non-orthogonal multiple access (NOMA) with the codebook automatically generated based on the channel or positioning of the UEs and APs.

In other words, even though all UEs share the same time-frequency resource for transmission, they can still be distinguished at the receiver side because each UE has a unique spatial channel signature. This allows more UEs to access the network simultaneously and achieve higher overall system throughput.

The key challenge then is to effectively detect the transmitted symbol $x_k$ from each UE based on the received signal $y_l$ which consists of a mixture of signals from all UEs. This detection process needs to undo the "mixing" of signals that occurs during propagation through the wireless channel.

Note that in conventional MIMO systems where each antenna transmits a different signal stream, most elements (absolute value of h) in the channel matrix tend to have appreciable strength due to the small spacing between transmitting antennas and the receiving antennas. However, in the channel model of FIG. 8, some UEs are located far from certain APs, resulting in weaker channel responses (some elements of the h matrix) with smaller absolute values. That is, in the channel model of FIG. 8, most elements of the channel matrix have small absolute values, with only a few elements (e.g. corresponding to antenna pairs with strong coupling) having large absolute values.

Figure 9:
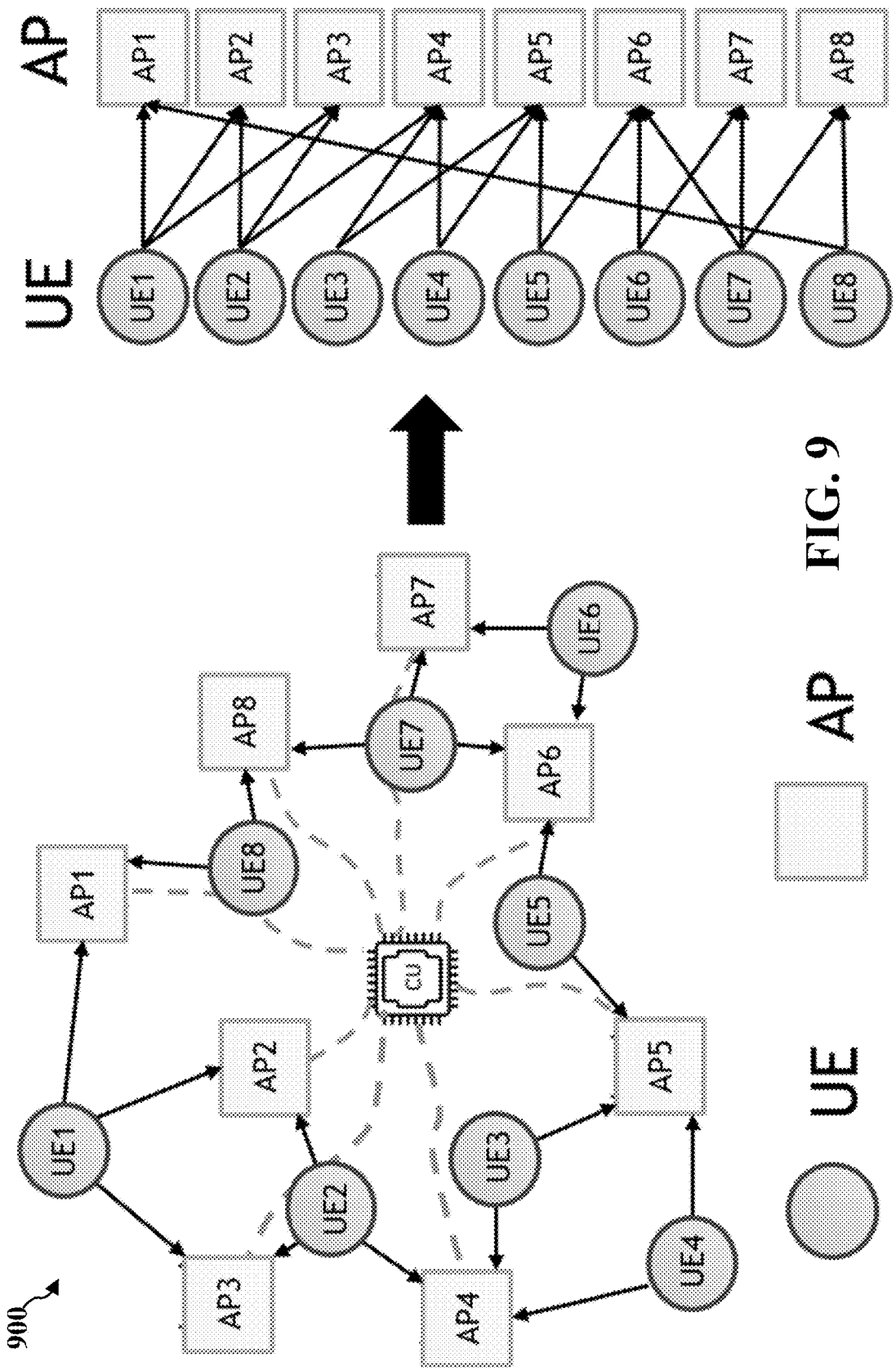
FIG. 9 is a diagram illustrating a factor graph (FG).

FIG. 9 is a diagram 900 illustrating a factor graph (FG), which is utilized by a message passing algorithm (MPA) applied in the cell-free system. The use of MPA requires first constructing an FG. As shown in a network diagram on the left side of FIG. 9, the FG is constructed by connecting UE-AP pairs with sufficiently strong signals (e.g., great than a threshold) using edges, which represent the connections between UE-AP pairs. After rearrangement, the factor graph on the right side of FIG. 9 can be formed. In this case, the connections between UEs and APs are called edges, meaning UE-AP pairs with strong signals are connected using edges. The UE may have a structure similar to that of the UE 250. The AP may have a structure similar to that of the bast station 210.

As mentioned earlier, in the cell-free network shown in the left diagram of FIG. 9, only a few elements in the channel matrix h have large absolute values due to the spatial distribution. Here, the edges are sparse. Considering the complexity of MPA afterwards, when constructing the factor graph, each AP can be set to have at most $K_{max}$ edges. For example, in a constructed factor graph, all APs can be set to have at most three arrow lines as shown in FIG. 9, that is $K_{max}=3$.

After the factor graph is constructed, the MPA can begin execution. In MPA, each access point (AP) first estimates, based on the summed received signal, the probability of each possible symbol being transmitted by each user equipment (UE) connected to it.

For example, as shown in FIG. 9, AP1 is connected to UE1 and UE8. Therefore, AP1 estimates the probability of UE1 and UE8 transmitting each constellation point (4 points for QPSK modulation). After all APs finish the probability estimation, the APs report the probability estimates to the UEs and the UEs then perform estimation.

Taking UE1 as an example, it is connected to AP1, AP2 and AP3. Thus, UE1 receives the probability estimates from AP1, AP2 and AP3. Upon receiving the estimates, UE1 aggregates them to obtain a system-level estimate. UE1 then feeds this system-level estimate back to AP1, AP2 and AP3.

For AP1, it not only receives the estimate from UE1 but also the estimate from UE8. After obtaining the feedback estimates from the two UEs, AP1 adjusts its own probability estimate accordingly and feeds the adjusted estimate back to UE1 and UE8.

Through such iterative message passing between the UEs and APs, the estimates become increasingly accurate and converge to the system-level maximum likelihood estimate. Finally, when the estimates converge, the converged values serve as the output of the MPA.

Although the network architecture shown in the left diagram of FIG. 9 may appear similar to a conventional 8×8 MIMO system, cell-free networks can expand infinitely in all directions. In practice, there could be hundreds of APs and UEs in the network, possibly even thousands. In such large-scale systems, conventional MIMO detection techniques like MIMO precoding or direct MMSE equalization may become inefficient.

As the cell-free network grows proportionally in size, the computational complexity and energy consumption required tend to grow exponentially (e.g., cubically). A key motivation behind cell-free network research is scalability-ensuring that system performance does not degrade too severely as the network expands to serve more users over a wider area.

The message passing algorithm and proposed DMPA technique are designed to be scalable. As will be shown in subsequent sections, computational complexity can be managed even as the network size grows by leveraging the sparsity of AP-UE connections and introducing methods to reduce the number of points in the constellation that need to be considered during detection.

The DMPA algorithm dynamically adjusts the FG based on the detection confidence of UEs, reallocating computational resources to UEs that are more challenging to detect. This dynamic adjustment allows the cell-free network to efficiently manage its resources and improve the Quality of Service (QOS) for all UEs, especially those at the cell edges or with strong interference.

Further, from the perspective of detection at the receiver side, the UEs can be viewed as virtual nodes that help facilitate information exchange between APs.

For example, UE1 is connected to AP1, AP2 and AP3 as shown in FIG. 9. In the MPA process, UE1 does not actually use or have knowledge of what symbol was transmitted by itself. Rather, it simply aggregates the probability estimates received from AP1, AP2 and AP3 to obtain a system-level perspective. In this sense, UE1 is acting as a representative for itself, helping to combine the estimates from AP1, AP2 and AP3. The UEs and APs are both nodes on the receiver side, iteratively exchanging messages with each other to determine the actual transmitted symbols.

From a broader network perspective, APs consolidate information to a Central Unit (CU), which possesses the computational capability to process data from all APs. The CU may be implemented by a computing device that has, among other components, a processor, a memory, and a network interface. In practice, the CU holds all information from the APs. During the execution of the message passing algorithm or signal detection, there is no direct information exchange between APs. Instead, any necessary exchange occurs through the intermediary role of UEs. For instance, information exchange between AP1 and AP2 is facilitated indirectly; AP1 sends its information to UE1, which after aggregation, sends the consolidated information back to AP2. In this way, AP1 and AP2 exchange information via a common UE acting as an intermediary node.

Since all these interactions occur at high speed within the CPU, UE-based information exchange provides an efficient mechanism for the APs to reach a consensus on the transmitted symbols. Typically, convergence is achieved after around 4 iterations, where the APs and UEs each process information 4 times.

Variable Nodes (VN) represent the UEs in the cell-free MIMO network. Each VN corresponds to a UE and is associated with the potential symbols that the UE might transmit. The role of a VN is to aggregate probability estimates related to its transmitted symbol from connected Resource Nodes (RN) and to update its probability distribution based on the aggregated information.

Resource Nodes (RN), on the other hand, represent the APs in the network. Each RN is connected to multiple VNs and is responsible for estimating the probability of each VN transmitting each possible symbol based on the received signal. The RNs computes the marginal probability of the transmitted symbols from the connected UEs and passing this information back to the VNs for further processing.

The log-likelihood of receiving signal $y_l$ at the $l^{th}$ AP, given the transmitted symbol x, can be represented by the below equation:

$$Q(y_l|x) = \frac{-1}{\sigma_l^2 + c_l} \left\| y_l - \hat{h}_l^H \text{diag}(\sqrt{p})x \right\|^2 \qquad (2)$$

Here, $\sigma_l^2$ denotes the noise power at the $l^{th}$ AP, $C_l$ is the variance of the channel estimation error, $\hat{h}_l$ is the estimated channel vector, and p represents the transmission power of the UEs.

A message (in log domain) passed from the RN (AP) to the VN (UE) updates the probability estimate for each possible symbol xx transmitted by UE k as follows:

$$I^{log}_{r_l \to v_k}(x_k) = \max_{x', x'_k = x_k} \left\{ Q(y_l|x') + \sum_{k' \in R(l) \setminus k} I^{log}_{v_{k'} \to r_l}(x_{k'}) \right\} \qquad (3)$$

This process involves considering all possible constellation combinations (x') while maximizing the likelihood of the received signal and aggregating the feedback from other connected UEs (k').

A message passed back from the VN (UE) to the RN (AP) aggregates the probability estimates received from all connected APs except the $l^{th}$ AP as follows:

$$I^{log}_{v_k \to r_l}(x_k) = \sum_{l' \in V(k) \setminus l} I^{log}_{r_{l'} \to v_k}(x_k) \qquad (4)$$

This feedback mechanism enables the iterative refinement of symbol probability estimates based on the collective information from multiple APs.

The proposed DMPA algorithm for cell-free MIMO detection operates in the log domain to reduce computational complexity. Specifically, instead of directly multiplying and adding probability values, the log domain representation allows replacing multiplications with additions and additions with maximization operations.

As shown in Equation (2) for $Q(y_l|x)$, the exponential term from the Gaussian noise distribution is removed when converting to the log domain. This avoids computing the exponential function and simplifies the expression to just the squared error term.

Further, the summation of probability estimates from connected UEs in the standard domain is replaced with a maximization operation in the log domain version shown in Equation (3). More specifically, $Q(y_l|x')$ represents the log-likelihood of receiving signal $y_l$ at the $l^{th}$ AP given the transmitted symbol x', and $I^{log}_{v_{k'} \to r_l}(x_{k'})$ denotes the log-domain message passed from other UEs to the AP. Instead of summing all the probability estimates, the algorithm selects the maximum value among them. This approach simplifies the computation and is particularly effective in scenarios where the objective is to identify the most probable event or symbol.

In the maximization operation for probability estimation in the proposed DMPA algorithm as shown in Equation (3), x' represents possible symbol combinations from the M-ary constellation, where one of the symbol $x_k$ is fixed to a given value for UE k. Each AP is initially connected to $K_{max}$ UEs that have the strongest channel gains to that AP. This is represented by the set R(l) which contains the indices of UEs connected to AP l. The maximization is over all possible constellation combinations x' out of a total of $M^{K_{max}-1}$ possibilities. In other words, M is the modulation order (e.g., M=4 for QPSK) and $K_{max}$ is the maximum number of UEs that an AP is set to serve.

Therefore, when computing the probability estimate in Equation (3) for a given UE k, the algorithm needs to evaluate $M^{K_{max}-1}$ possible symbol combinations x' transmitted by other UEs in R(l). Out of these combinations, the one that maximizes the likelihood $Q(y_l|x')$ is selected.

The reason for the exponent $K_{max}-1$ rather than just $K_{max}$ is that one of the symbols $x_k$ is fixed for UE k when calculating its probability. So the number of possible combinations to search over is reduced by 1 UE. That is, the algorithm must evaluate the likelihood of receiving the observed signal $y_l$ for each possible combination of transmitted symbols from all UEs connected to the AP, except for the UE currently being updated. The large number of possible combinations significantly increases the computational complexity of the DMPA algorithm.

Although UE-AP pairs without connecting edges, such as UE5 and AP8 in FIG. 9, do not show a signal path based on the network architecture, a weak signal still propagates in the actual network when UE5 transmits. Treating this weak signal directly as noise would cause an error floor in the bit error rate performance. To address this issue, an alternative interference handling approach is proposed.

As described previously, during the iterative process, each UE estimates the probability of transmitting each possible constellation point. Among these estimated probabilities, the UE assumes the constellation point with the highest probability was transmitted. After hypothetically transmitting this most likely constellation point, the corresponding signal is subtracted from the received signal at APs without direct UE connections.

For example, AP1 determines the current most probable constellation point for UE2 based on the probability estimates. AP1 then subtracts this constellation point from the received signal, under the assumption that this was the symbol transmitted by UE2. This approach removes the signals from non-connected UEs that would otherwise be treated as interference. The interference handling can be mathematically expressed as:

$$\max_{x', x'_k = x_k, k \in R(l)} \left\{ Q(y_l|x') + \sum_{k' \in R(l) \setminus k} I^{log}_{v_{k'} \to r_l}(x_{k'}) \right\} \qquad (5)$$

$$x'_{k_o} = \text{argmax } Q(x_{k_o}), k_o \notin R(l)$$

This equation shows that before the AP update, the signals from non-connected UEs $k_o$ (where $k_o \notin R(\ell)$) are cancelled by assuming the most probable constellation point $x'_{k_o}$ was transmitted. This avoids having to treat these UE signals as interference, preventing an error floor in the system performance.

Figure 10:
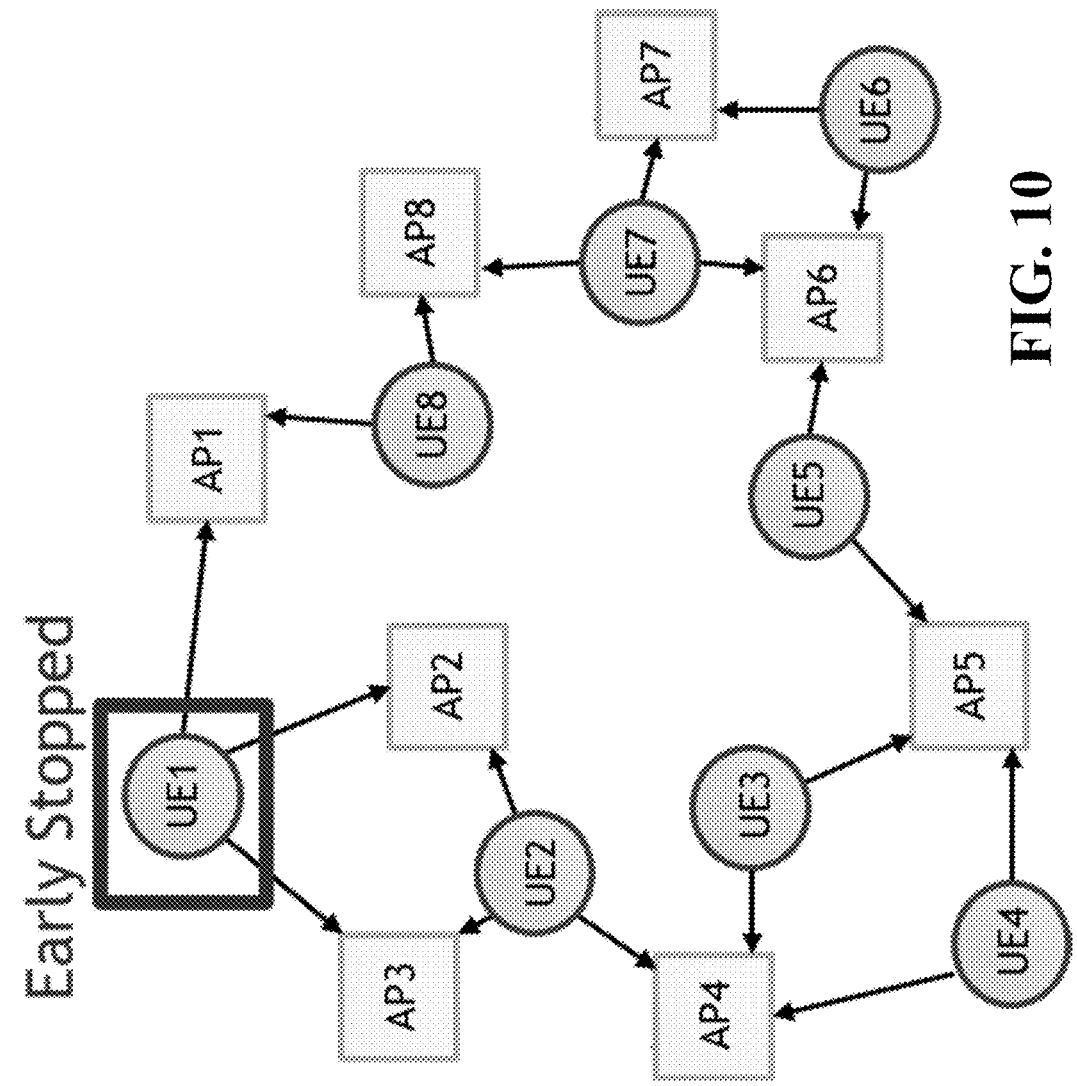
FIG. 10 is a diagram illustrating dynamic adjustment of the factor graph.

FIG. 10 is a diagram 1000 illustrating dynamic adjustment of the factor graph. After an iteration of MPA converges, some UEs may already have sufficiently high bit log-likelihood ratios (LLRs). For example, UEs close to cell centers experience lower interference and therefore converge faster. In this example, UE1 is early stopped. For a constellation such as QPSK represented by two bits, if both bit LLRs are high enough after MPA convergence, the decoding result can be deemed highly reliable. Such UEs can be early stopped, meaning they are removed from the detection process without further processing.

As mentioned previously, each AP is set to connect to $K_{max}$ UEs initially. The purpose is to constrain the computational complexity. Hence, when a UE like UE1 in FIG. 10 is early stopped, the number of connected UEs reduces to $K_{max}-1$. This allows assigning new UEs to AP1 to take advantage of the spare resources made available by early stopping UE1. In other words, the computational resources saved from early stopping can be reallocated to assist the remaining UEs, thereby improving overall system performance.

Figure 11:
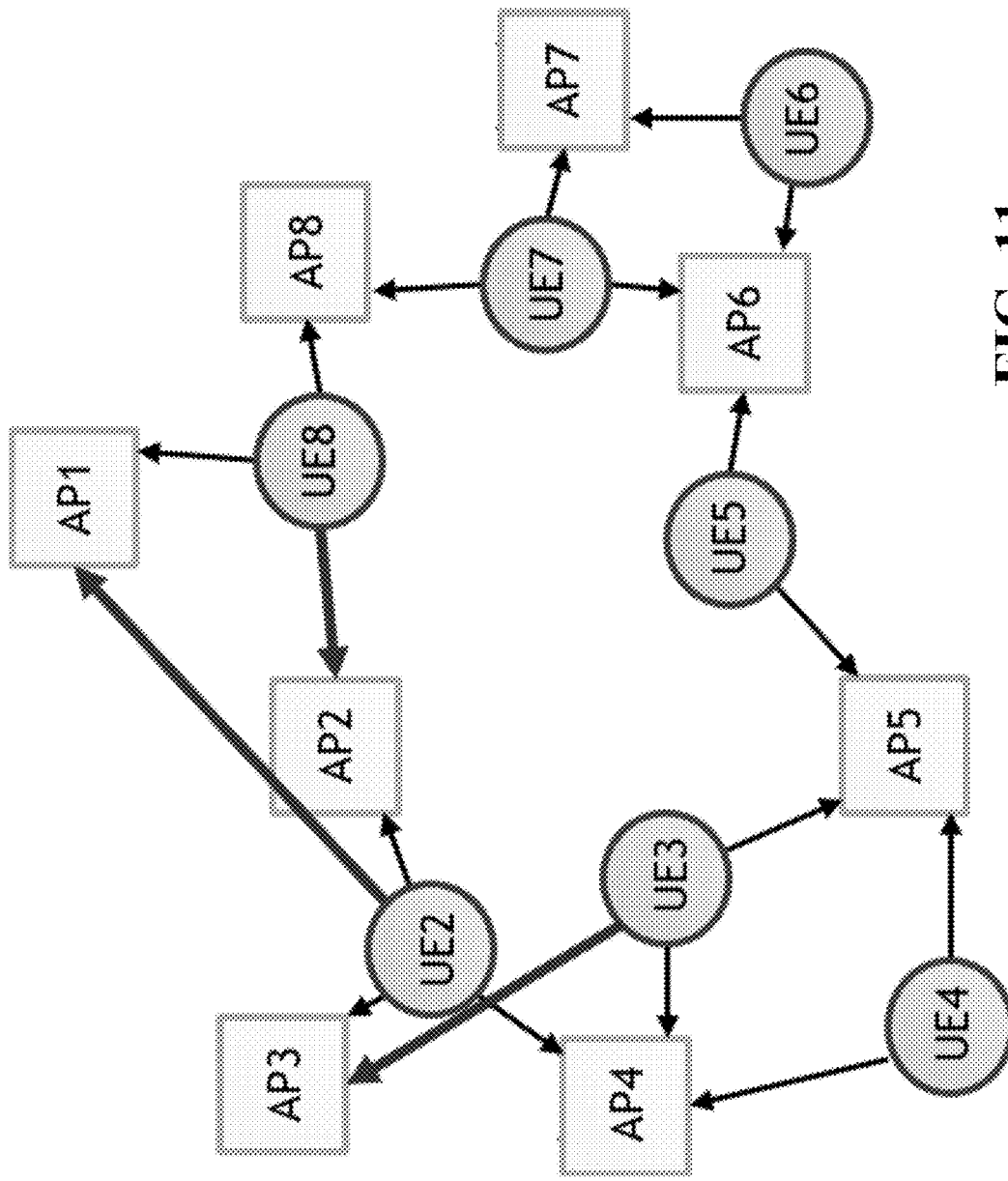
FIG. 11 is a diagram illustrating a dynamically adjusted factor graph.

FIG. 11 is a diagram 1100 illustrating a dynamically adjusted factor graph. In this example, after UE1 early stopped, UE2 can be newly assigned to AP1, UE8 can be newly assigned to AP2, and UE3 can be newly assigned to AP3. This maintains the number of UEs connected to AP1, AP2, AP3 at $K_{max}$. After such dynamic adjustment, a new factor graph is formed which can be further updated in subsequent iterations.

By alternating between MPA execution and factor graph adjustment involving early stopping and UE reassignment, the number of undecoded UEs decreases over time. The remaining UEs are typically the difficult ones to detect, either near the cell edge or experiencing strong interference. Concentrating computational resources onto these challenging UEs allows determining their transmitted messages reliably. In other words, the dynamic approach appropriately allocates fewer resources to easily decodable UEs while focusing more resources on difficult UEs to optimize resource utilization.

In interference handling described supra, the most probable transmitted signal from a UE is assumed and directly subtracted from the received signal at the Access Points (APs). This approach is refined from the conventional method where the signal from a non-connected UE, such as UE2, is treated as noise if not directly connected to an AP like AP1.

Upon assigning UE2 to AP1, AP1 begins to evaluate the probability of UE2 transmitting each of the four symbols in its constellation. This adjustment allows AP1 to consider the actual likelihood of each symbol being transmitted by UE2, rather than merely subtracting the most probable symbol.

Figure 12:
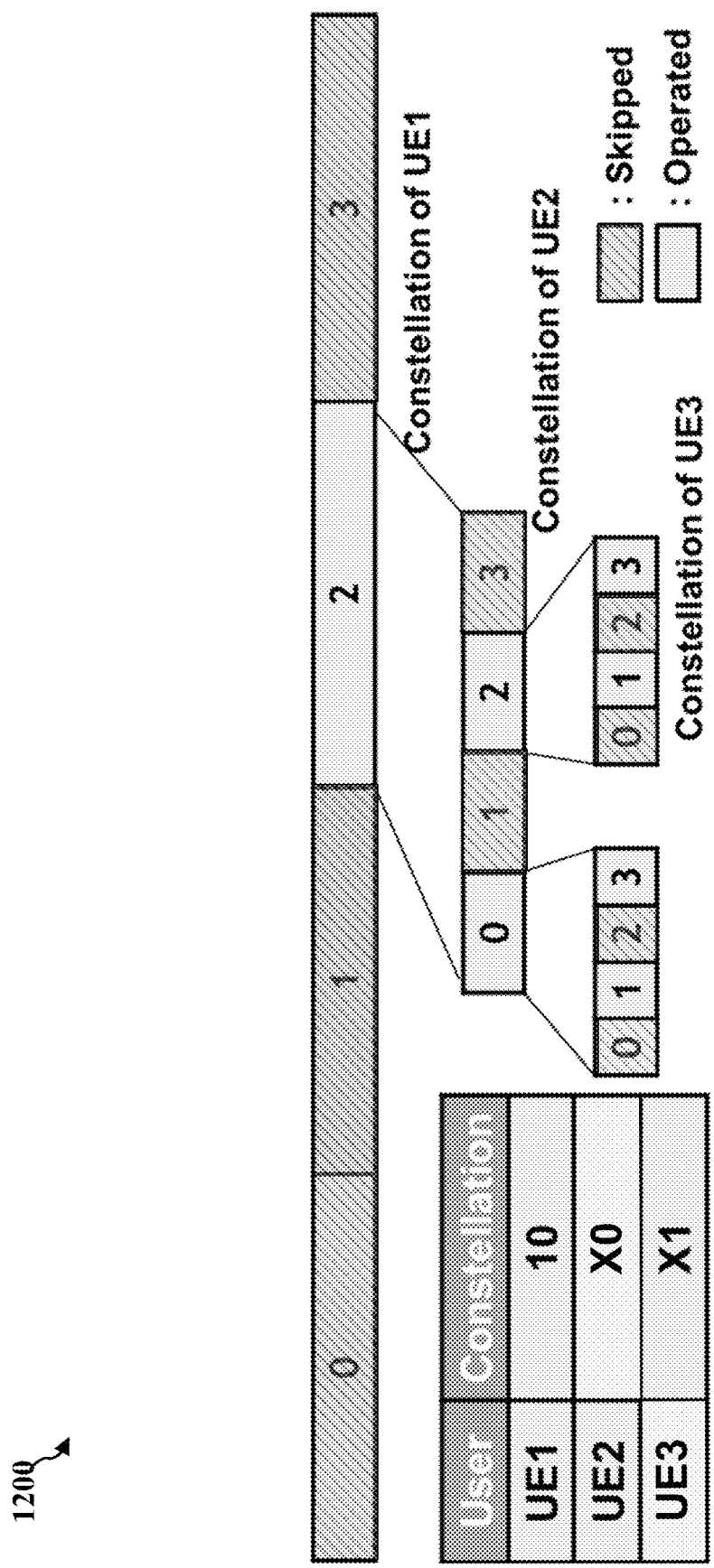
FIG. 12 is a diagram illustrating a technique of LLR-Based Constellation Truncation.

FIG. 12 is a diagram 1200 illustrating a technique of LLR-Based Constellation Truncation, which is a low-complexity technique employed in the proposed DMPACT (Dynamic MPA with Constellation Truncation) detector for cell-free MIMO systems.

As mentioned previously, the computational complexity of the message passing algorithm arises from evaluating the marginal probability in Equation (3) over all possible symbol combinations from the M-ary constellation (there are $M^{K_{max}-1}$ combinations). To reduce this complexity, one approach is to truncate less likely constellation points to decrease the number of combinations that must be considered.

Within the proposed DMPA algorithm, UEs whose bit LLRs exceed a set threshold are early stopped. This means that when the absolute value of the LLR for one of the bits, e.g., corresponding to one dimension of the 2D QPSK constellation space, is high enough, that bit can be frozen and the less likely constellation points along that dimension can be truncated.

For example, assuming one bit is frozen due to a high LLR, only two constellation points need to be considered along the unfrozen dimension rather than all four points initially. By freezing one bit, the constellation space is reduced by half, directly decreasing the number of combinations in Equation (3) that must be evaluated. This approach of truncating based on bit LLRs is referred to as LLR-based constellation truncation.

In the context of a cell-free MIMO network, where multiple user equipments (UEs) simultaneously transmit data over the same time-frequency resource, the DMPACT detector dynamically adjusts the factor graph and employs constellation truncation to manage the complexity of detecting the transmitted symbols from each UE. As the message passing algorithm (MPA) iterates and converges, the bit log-likelihood ratios (LLRs) for each UE are evaluated to determine the reliability of the detected symbols.

The diagram shows three UEs (UE1, UE2, and UE3) and their respective constellations (representing the set of possible transmitted symbols). Each UE's constellation is represented by a set of points, where each point corresponds to a possible symbol in the modulation scheme (e.g., QPSK with four points). In this example, the constellation of UE1 is represented by the binary sequence "10," UE2 by "X0," and UE3 by "X1," where "X" denotes a bit whose LLR is not high enough to be considered reliably detected or is still under consideration.

The LLR-Based Constellation Truncation technique operates as follows:

When the LLR for a particular bit of a UE is sufficiently high, indicating a high confidence in the detection of that bit, the constellation points corresponding to the opposite value of that bit can be truncated (skipped). This effectively reduces the number of constellation points (and hence the number of constellation combinations) that need to be considered in subsequent iterations of the MPA.

For example, if UE2 has a high LLR for the second bit being "0," the constellation points corresponding to the second bit being "1" can be skipped. This is depicted in the diagram where the constellation points "1" and "3" for UE2 are shaded, indicating they are skipped in the MPA process.

The truncation process is applied individually for each bit based on its LLR. If only one bit LLR is high enough, only the constellation points inconsistent with that bit's value are skipped. This is shown in the diagram where, for UE3, only the constellation points inconsistent with the second bit being "1" are skipped.

The remaining constellation points, which are consistent with the high LLR bits, are still considered (operated) in the MPA process. These points are more likely to represent the actual transmitted symbol and are marked with clear boxes in the diagram.

This truncation technique significantly reduces the computational complexity of the DMPACT detector by decreasing the number of potential symbol combinations that need to be evaluated. By focusing only on the most probable symbols, based on the LLR estimates, the detector can efficiently determine the transmitted symbols with reduced computational effort.

However, LLR values are only available after the initial MPA convergence. An alternative truncation method named initial constellation truncation can be applied before starting the first MPA iteration by exploiting the achievable rates:

$$R_k = \sum_{l=1}^{L} \log_2\left(1 + \frac{p_k \beta_{k,l}}{\sigma_l^2 + \sum_{k' \neq k} p_{k'} \beta_{k',l}}\right) \quad (6)$$

Here, $\beta_{k,l}$ is the large-scale fading coefficient between UE k and AP l, $p_k$ is the transmission power of UE k, and $\sigma_l^2$ is the noise power. $R_k$ effectively represents the number of bits UE k can transmit reliably based on its channel conditions and interference. By truncating one or two bits for UEs with high achievable rates even before starting MPA, the subsequent complexity can be reduced.

Specifically, the decision of which constellation points survive after truncation is made based on their proximity to the soft output constellation from a minimum mean squared error and successive interference cancellation (MMSE-SIC) detector. Closer constellation points have higher likelihood and are retained while farther points are discarded to limit the combinations considered during MPA execution.

Figure 13:
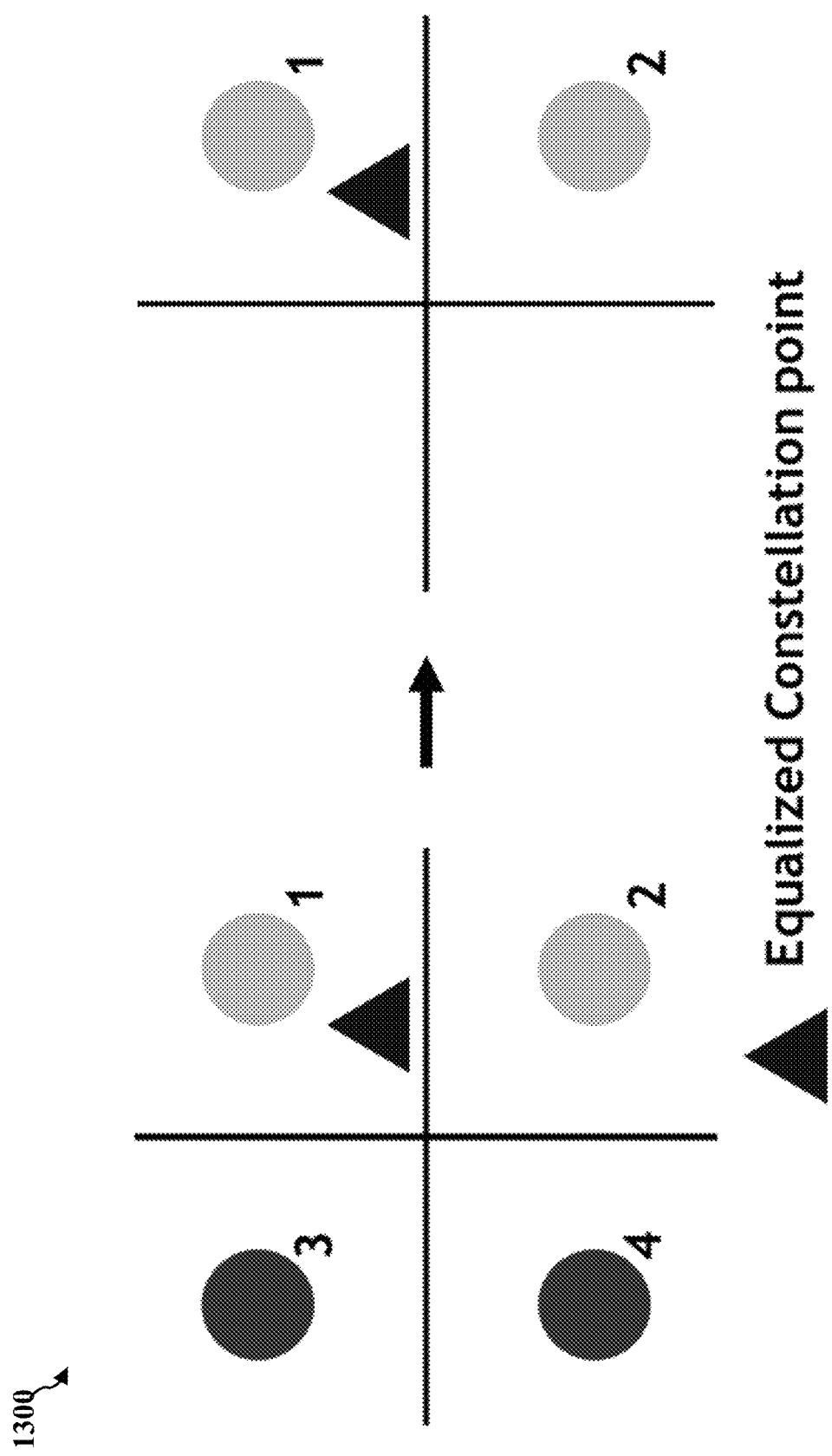
FIG. 13 is a diagram illustrating a technique of Initial Constellation Truncation.

FIG. 13 is a diagram 1300 illustrating the technique of Initial Constellation Truncation. When applying initial constellation truncation, decisions are made regarding 1) how many bits to freeze for each UE, and 2) which bits to freeze. The number of bits to freeze can be determined based on the achievable rate $R_k$ of each UE. A high achievable rate means the UE experiences low interference or high signal strength. Based on this metric, one or two bits can be frozen to limit subsequent complexity.

Further, which constellation points to retain after freezing those bits is determined by evaluating the likelihood of each point based on its proximity to the soft output constellation from an initial minimum mean squared error successive interference cancellation (MMSE-SIC) detector.

The MMSE-SIC detector is first applied to equalize the received signal and produce a soft estimate of the transmitted symbol for each UE. An example output constellation after MMSE-SIC equalization is shown in FIG. 13. Constellation points closer to this equalized soft value have higher likelihood to represent the actually transmitted symbol.

Hence, the surviving constellation points after initial truncation are selected based on their distance from the equalized symbol. In the example shown in FIG. 13, with 1 bit frozen, points 1 and 2 remain while points 3 and 4 are discarded since they lie farther from the equalized constellation. By retaining only the closest constellation points to the soft MMSE-SIC output, complexity is reduced while focusing on the most likely candidate symbols for each UE during subsequent MPA execution.

Figure 14:
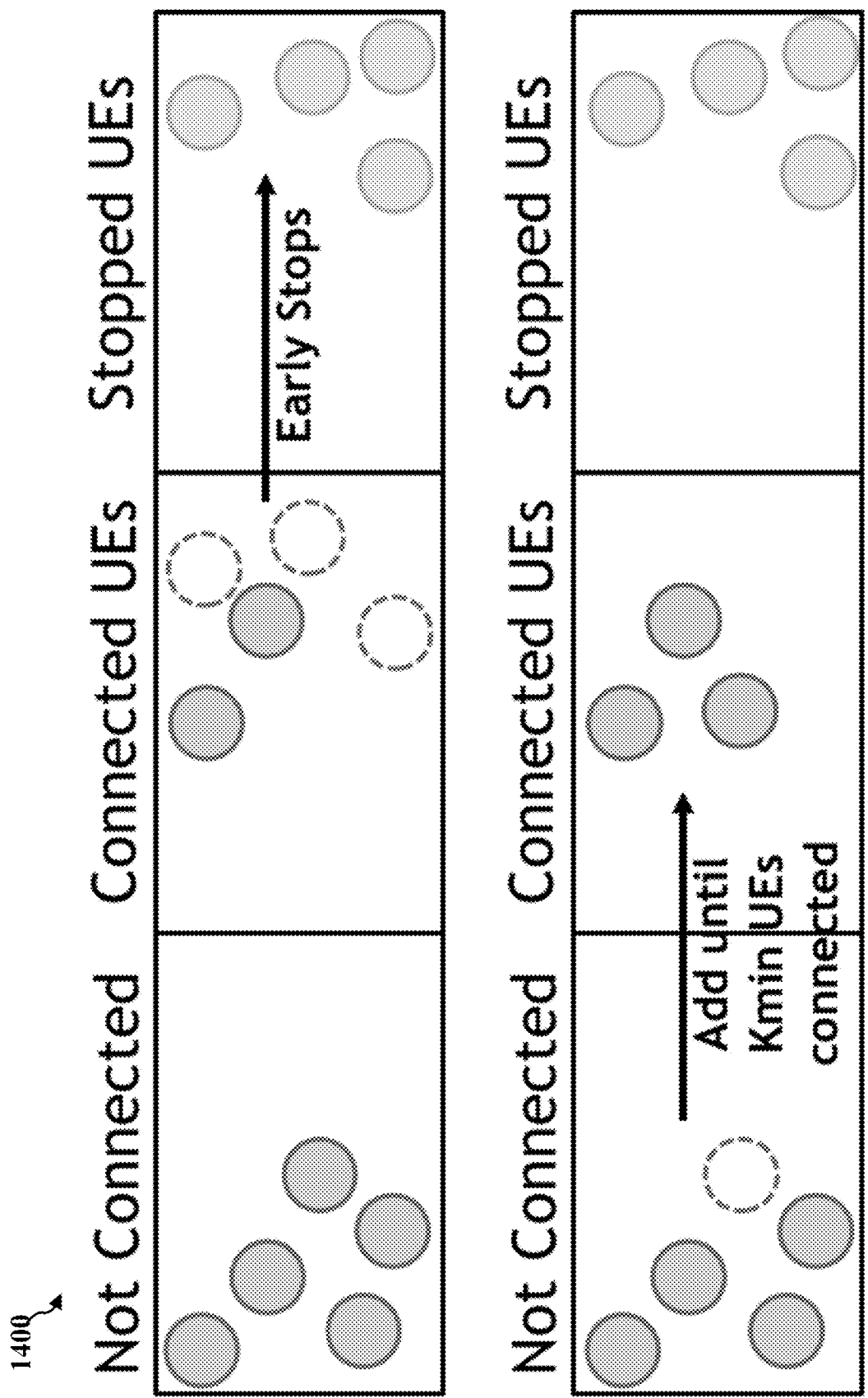
FIG. 14 is a diagram illustrating the technique of Refined FG Adjustment.

FIG. 14 is a diagram 1400 illustrating the technique of Refined FG Adjustment. This technique aims to reduce the complexity exponent $K_{max}-1$ in the number of constellation combinations $M^{K_{max}-1}$ that need to be evaluated during message passing, as shown in Equation (3).

As described supra, the initial setting of $K_{max}$ determines the maximum number of UEs that each AP serves, which should be set based on UE density to connect each UE to its closest APs. This establishes a proper initial factor graph. Thus, $K_{max}$ cannot be simply reduced from the start.

However, once the factor graph undergoes dynamic adjustment after some UEs are early stopped, the remaining UEs served by each AP tend to be those located farther away. At this point, it becomes viable to slightly reduce $K_{max}$ to decrease complexity.

To enable this reduction, a new parameter $K_{min}$ is introduced representing the minimum number of UEs to be served by each AP:

$$K_{min} \leq K_{max}$$

Initially, each AP serves $K_{max}$ UEs. But after some UEs are early stopped, new UEs will be assigned to an AP only if the number of remaining connected UEs falls below $K_{min}$. This avoids fully re-populating the AP with $K_{max}$ UEs again, thereby reducing the number of combinations evaluated in the MPA process.

In the example of FIG. 14, initially $K_{max}=5$ and, accordingly, 5 UEs are connected to a given AP. After 3 UEs are early stopped, only 2 UEs remain connected to that AP. With $K_{min}=3$, only 1 additional UE needs to be assigned instead of 2 to regain 5 connections. This refinement keeps the connectivity adequate while limiting $K_{max}-1$, reducing the computational load accordingly.

By introducing the $K_{min}$ parameter and avoiding fully replenishing disconnected UEs after early stopping, the refined factor graph adjustment method strategically lowers the exponent in the number of constellation combinations evaluated by each AP. This decreases the complexity of the proposed DMPACT detector.

FIG. 15 is a diagram 1500 listing an exemplary algorithm 1 for the DMPACT (Dynamic MPA with Constellation Truncation) detector used in a cell-free MIMO system. The key steps of the algorithm are:

Initialize the factor graph by having each AP connect to the $K_{max}$ UEs with the strongest channel gains (lines 3-5).

Apply initial constellation truncation to limit complexity before starting MPA iterations (line 7).

Run iterative message passing algorithm (MPA) between UEs and APs to estimate symbol probabilities (lines 9-16).

Early stop UEs whose bit LLRs exceed a threshold and readjust UE-AP connections (lines 17-24).

Repeat MPA iterations on updated factor graph (lines 8-26).

Output bit LLRs once all UEs converge below the threshold (line 27).

The core techniques to enable low-complexity detection are:

Dynamic adjustment of the factor graph during MPA execution.

Initial constellation truncation based on achievable rates and MMSE-SIC.

LLR-based constellation truncation during MPA.

Refined factor graph adjustment using thresholds $K_{max}$ and $K_{min}$.

These methods work together to focus computational resources on UEs that are more difficult to detect while reducing unnecessary computations for UEs that can be decoded sooner.

More specifically, as introduced previously in FIG. 9, the factor graph represents connections between UEs and APs in the cell-free MIMO system. Before running the message passing algorithm (MPA), the factor graph must be initialized by connecting each AP to a set of UEs (lines 3-5 in Algorithm 1).

To constrain complexity, every AP is initially connected to $K_{max}$ UEs that have the strongest channel connections to that AP. $K_{max}$ is a design parameter that depends on the UE density. A properly chosen $K_{max}$ ensures each UE is served by its closest APs to establish an appropriate initial factor graph. The set R(l) stores the indices of UEs connected to the $l^{th}$ AP.

As shown previously in Equation (3), the probability estimation involves searching over $M^{K_{max}-1}$ combinations, where M is the modulation order. Before even starting the MPA iterations, the technique of initial constellation truncation is applied (line 7 of Algorithm 1) to discard less likely constellation points and limit this search space.

The decision of which points to truncate relies on the achievable rate $R_k$ defined in Equation (6). A high rate indicates the UE can reliably transmit more bits, implying lower interference or higher signal strength. Based on $R_k$, one or two bits are frozen to reduce complexity.

Further, the surviving constellation points are selected based on their proximity to the output constellation from an initial MMSE-SIC detector. By retaining only points closest to the soft MMSE-SIC estimate, complexity is focused on the most probable symbols while unlikely candidates are discarded.

After initializing the connections and constellations, iterative message passing takes place between UEs and APs to estimate symbol probabilities (lines 9-16).

The APs compute likelihood values based on the received signals and pass messages to connected UEs (line 11). The UEs in turn aggregate estimates from all serving APs and return updated messages (lines 12-14). After multiple iterations, the estimates converge.

Within each MPA iteration, interference from non-connected UEs is cancelled by assuming the most likely symbol was sent (as described previously). This prevents an error floor.

Once the MPA converges, UEs with reliably detected bits can be early stopped to reallocate resources (lines 17-24). Early stopping decisions are made based on the absolute bit LLR values. When all the bit LLRs for a UE exceed a threshold, that UE is removed from the factor graph (line 18). The APs previously serving that UE now have spare resources. New UEs are connected to these APs until the number of connected UEs reaches $K_{min}$ again (lines 20-23). This readjustment allows concentrating more computational effort on the remaining undecoded UEs. In each subsequent MPA iteration, fewer UEs typically remain as more UEs converge over time. The later-stage iterations focus resources on UEs with weaker signals that require more processing. The threshold for early stopping is gradually reduced as well to promote faster convergence (line 25).

In addition to adjusting the factor graph, the technique of LLR-based constellation truncation is applied during the message passing algorithm (line 19 of Algorithm 1). Similar to initial truncation, this method aims to decrease complexity by reducing the number of constellation points considered in computing Equation (3). Specifically, when the absolute LLR value for one bit is high enough, the constellation points inconsistent with that bit's value can be skipped as they become unlikely. With one frozen bit, only half the initial constellation space needs to be evaluated. By truncating in a bit-wise manner based on LLR feedback within the iterative MPA, significant complexity savings are achieved with no performance loss. Together, all the mentioned techniques enable low-complexity and reliable symbol detection in cell-free MU-MIMO networks using the proposed DMPACT detector. Dynamic factor graph adjustment allows computational effort to be focused as needed on difficult UEs while constellation truncation methods avoid unnecessary complexity.

In certain configurations, the MPA for detecting the transmitted symbols from all UEs is executed at the central unit (CU) in the cell-free MIMO network. The CU is a centralized entity that possesses strong computational capabilities and is connected to all the APs via backhaul links, such as optical fibers, as shown in FIG. 7.

During uplink data transmission, each AP receives a superposition of the signals transmitted by all UEs. The received signals $y_l$ at each AP, as described in Equation (1).

At the CU, the MPA is performed to estimate the transmitted symbols $x_k$ from all UEs based on the received signals $y_l$ from all APs. The MPA operates on the factor graph representation of the cell-free MIMO system, as illustrated in FIG. 9. The factor graph captures the connections between the UEs (variable nodes) and APs (resource nodes) based on the strength of the wireless links.

The MPA iteratively exchanges messages between the variable nodes and resource nodes to refine the estimates of the transmitted symbols. In each iteration, the resource nodes (APs) compute the likelihood of receiving the observed signals given the possible transmitted symbols and pass these likelihoods as messages to the connected variable nodes (UEs). The variable nodes then aggregate the messages from all connected resource nodes and update their own symbol probabilities, which are then passed back to the resource nodes for the next iteration.

This iterative message passing process, as described by Equations (2)-(4), may be performed entirely at the CU. The CU has access to the received signals from all APs and the channel state information (CSI) between the UEs and APs, enabling it to construct the factor graph and execute the MPA.

The APs may not directly participate in the MPA computation. Instead, they forward their received signals to the CU and receive the final detected symbols from the CU after the MPA convergence. This centralized approach leverages the high computational power of the CU and avoids the need for direct communication between the APs during the detection process.

However, the MPA still models the exchange of information between APs as messages passed through the variable nodes (UEs). In the factor graph, a message from an AP to a UE represents the AP's estimate of the UE's transmitted symbol based on its own received signal. A message from a UE to an AP represents the UE's updated symbol probabilities based on the aggregated information from all connected APs.

These messages are not physically transmitted between the APs but are computed and used within the MPA at the CU. The CU has information from all APs and can efficiently compute and pass these messages internally during the MPA iterations. The UEs serve as intermediate nodes in the factor graph, facilitating the exchange of information between APs in the MPA computations performed at the CU.

By executing the MPA at the CU, the cell-free MIMO system can efficiently detect the transmitted symbols from all UEs using the collective information from all APs. The CU's centralized processing enables the realization of the cooperative gains offered by the cell-free architecture while managing the computational complexity of the detection process.

Figure 16:
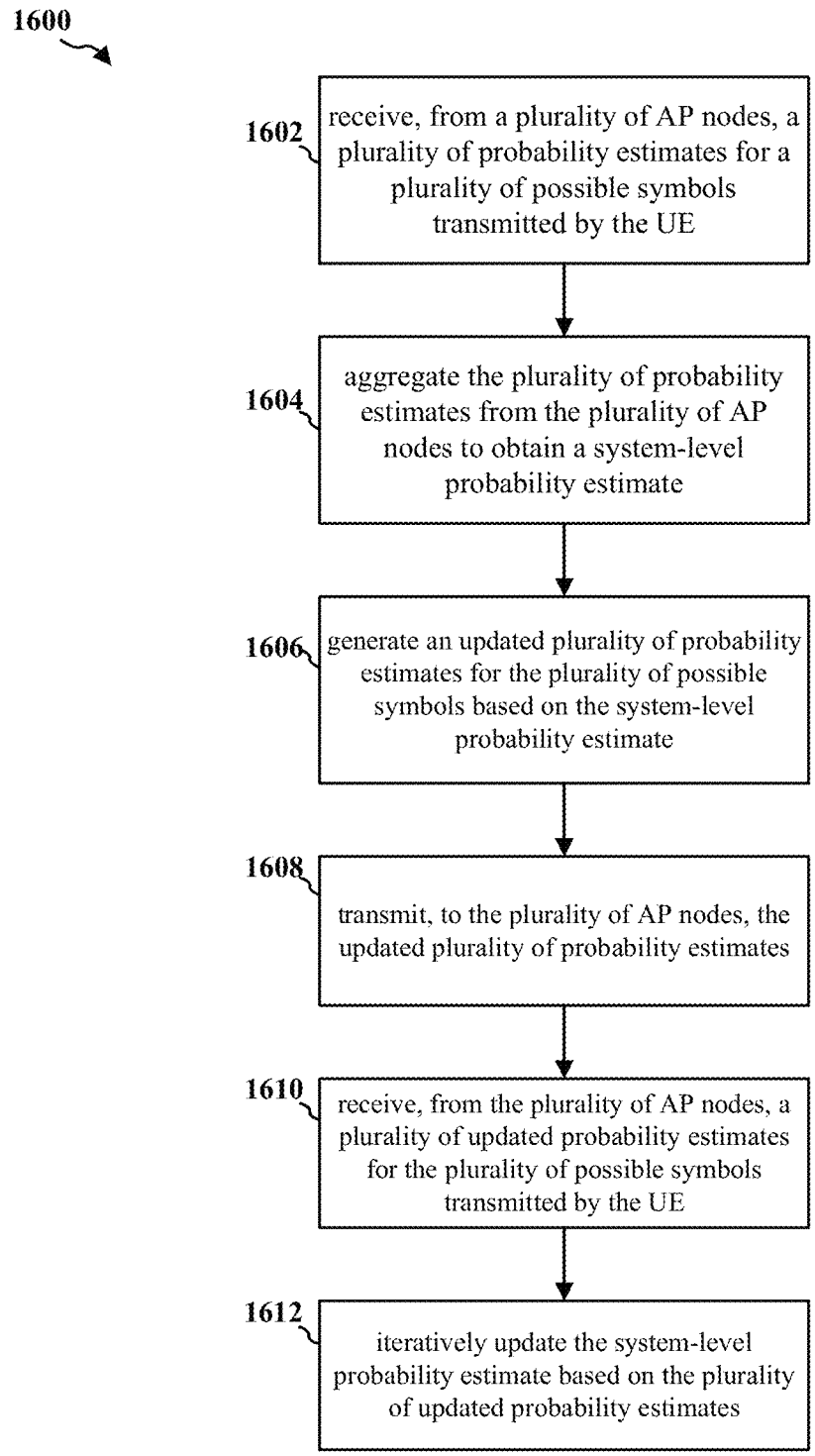
FIG. 16 is a flow chart of a method for detecting uplink symbols.

FIG. 16 is a flow chart 1600 of a method for detecting uplink symbols. The method may be performed by a UE node (e.g., the UE nodes in FIG. 9). In operation 1602, the UE node receives, from a plurality of access point (AP) nodes, a plurality of probability estimates for a plurality of possible symbols transmitted by the UE. In operation 1604, the UE node aggregates the plurality of probability estimates from the plurality of AP nodes to obtain a system-level probability estimate. In operation 1606, the UE node generates an updated plurality of probability estimates for the plurality of possible symbols based on the system-level probability estimate. In operation 1608, the UE node transmits, to the plurality of AP nodes, the updated plurality of probability estimates.

In certain configurations, the UE node acts as an intermediary node to facilitate information exchange between the plurality of AP nodes in a message passing algorithm executed at a central unit.

In operation 1610, the UE node receives, from the plurality of AP nodes, a plurality of updated probability estimates for the plurality of possible symbols transmitted by the UE. In operation 1612, the UE node iteratively updates the system-level probability estimate based on the plurality of updated probability estimates. In certain configurations, the iterative updating continues until a convergence criterion is met.

In certain configurations, the UE node computes a bit log-likelihood ratio (LLR) for each bit of the plurality of possible symbols based on the system-level probability estimate. The UE node determines that the UE has converged when the bit LLR for each bit exceeds a predetermined threshold. The UE node may transmit, to the plurality of AP nodes, a convergence message indicating that the UE node has converged.

In certain configurations, the UE node receives, from the plurality of AP nodes, a plurality of truncated probability estimates for a subset of the plurality of possible symbols. The UE node generates the updated plurality of probability estimates based on the plurality of truncated probability estimates. The subset of the plurality of possible symbols is determined based on an achievable rate of the UE.

Figure 17:
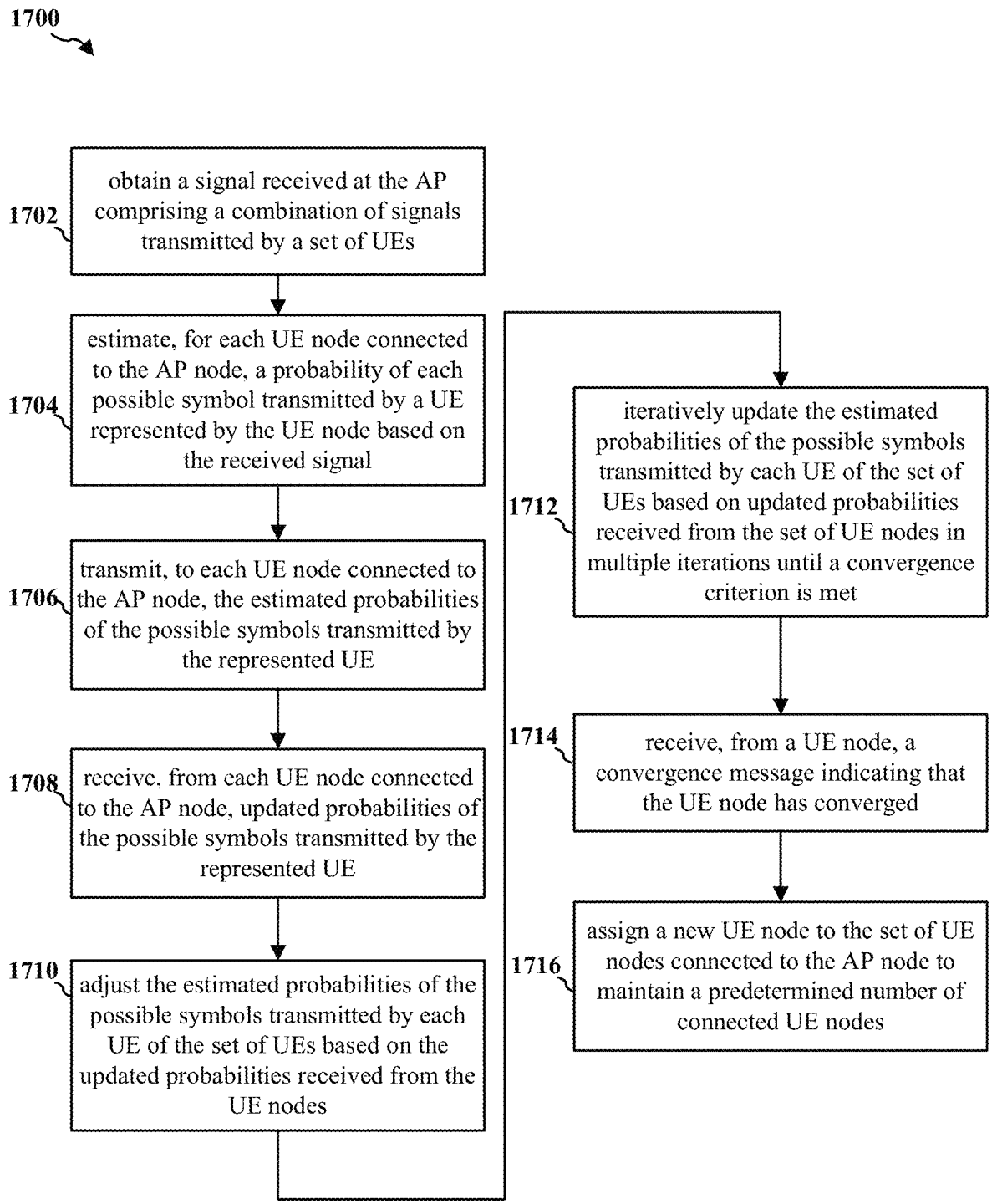
FIG. 17 is a flow chart of another method for detecting uplink symbols.

FIG. 17 is a flow chart 1700 of another method for detecting uplink symbols. The method may be performed by an AP node (e.g., the AP nodes in FIG. 9). In operation 1702, the AP node obtains a signal received at the AP comprising a combination of signals transmitted by a set of UEs in the cell-free MIMO network, the set of UE nodes representing the set of UEs are connected to the AP node. In operation 1704, the AP node estimates, for each UE node connected to the AP node, a probability of each possible symbol transmitted by a UE represented by the UE node based on the received signal. In operation 1706, the AP node transmits, to each UE node connected to the AP node, the estimated probabilities of the possible symbols transmitted by the represented UE.

In operation 1708, the AP node receives, from each UE node connected to the AP node, updated probabilities of the possible symbols transmitted by the represented UE. In operation 1710, the AP node adjusts the estimated probabilities of the possible symbols transmitted by each UE of the set of UEs based on the updated probabilities received from the UE nodes.

In operation 1712, the AP node iteratively updates the estimated probabilities of the possible symbols transmitted by each UE of the set of UEs based on updated probabilities received from the set of UE nodes in multiple iterations until a convergence criterion is met. In operation 1714, the AP node receives, from a UE node, a convergence message indicating that the UE node has converged. The AP node removes the converged UE node from the set of UE nodes connected to the AP node. In operation 1716, the AP node assigns a new UE node to the set of UE nodes connected to the AP node to maintain a predetermined number of connected UE nodes.

In certain configurations, the AP node cancels interference from UE nodes not connected to the AP node by subtracting a signal corresponding to a most probable symbol transmitted by each unconnected UE node from the received signal.

In certain configurations, the AP node truncates a set of possible symbols for each UE node to a subset of possible symbols based on an achievable rate of the represented UE. The AP node estimates the probability of each possible symbol in the subset of possible symbols for each UE node. In certain configurations, to truncate the set of possible symbols, the AP node selects the subset of possible symbols for each UE node based on a proximity of each possible symbol to a soft estimate of the transmitted symbol obtained from a minimum mean squared error (MMSE) detector.

In certain configurations, the AP node truncates a set of possible symbols for each UE node to a subset of possible symbols based on a bit log-likelihood ratio (LLR) of each bit of the possible symbols. The AP node estimates the probability of each possible symbol in the subset of possible symbols for each UE node.

In certain configurations, the AP node adjusts a number of UE nodes connected to the AP node based on a predetermined maximum number of connected UE nodes and a predetermined minimum number of connected UE nodes.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE) node representing a UE in a cell-free multiple-input multiple-output (MIMO) network, the method comprising:
   receiving, from a plurality of access point (AP) nodes, a plurality of probability estimates for a plurality of possible symbols transmitted by the UE;
   aggregating the plurality of probability estimates from the plurality of AP nodes to obtain a system-level probability estimate;
   generating an updated plurality of probability estimates for the plurality of possible symbols based on the system-level probability estimate; and
   transmitting, to the plurality of AP nodes, the updated plurality of probability estimates.

2. The method of claim 1, wherein the UE node acts as an intermediary node to facilitate information exchange between the plurality of AP nodes in a message passing algorithm executed at a central unit.

3. The method of claim 1, further comprising:
   receiving, from the plurality of AP nodes, a plurality of updated probability estimates for the plurality of possible symbols transmitted by the UE; and
   iteratively updating the system-level probability estimate based on the plurality of updated probability estimates.

4. The method of claim 3, wherein the iterative updating continues until a convergence criterion is met.

5. The method of claim 1, further comprising:
   computing a bit log-likelihood ratio (LLR) for each bit of the plurality of possible symbols based on the system-level probability estimate; and
   determining that the UE has converged when the bit LLR for each bit exceeds a predetermined threshold.

6. The method of claim 5, further comprising:
   transmitting, to the plurality of AP nodes, a convergence message indicating that the UE node has converged.

7. The method of claim 1, further comprising:
   receiving, from the plurality of AP nodes, a plurality of truncated probability estimates for a subset of the plurality of possible symbols; and
   generating the updated plurality of probability estimates based on the plurality of truncated probability estimates.

8. The method of claim 7, wherein the subset of the plurality of possible symbols is determined based on an achievable rate of the UE.

9. A method of wireless communication by an access point (AP) node representing an AP in a cell-free multiple-input multiple-output (MIMO) network, the method comprising:
   obtaining a signal received at the AP comprising a combination of signals transmitted by a set of user equipments (UEs) in the cell-free MIMO network, wherein a set of UE nodes representing the set of UEs are connected to the AP node;
   estimating, for each UE node connected to the AP node, a probability of each possible symbol transmitted by a UE represented by a UE node based on the received signal;
   transmitting, to each UE node connected to the AP node, the estimated probabilities of the possible symbols transmitted by the represented UE;
   receiving, from each UE node connected to the AP node, updated probabilities of the possible symbols transmitted by the represented UE; and
   adjusting the estimated probabilities of the possible symbols transmitted by each UE of the set of UEs based on the updated probabilities received from the UE nodes.

10. The method of claim 9, further comprising:
    iteratively updating the estimated probabilities of the possible symbols transmitted by each UE of the set of UEs based on updated probabilities received from the set of UE nodes in multiple iterations until a convergence criterion is met.

11. The method of claim 9, further comprising:
    receiving, from a UE node, a convergence message indicating that the UE node has converged; and
    removing the converged UE node from the set of UE nodes connected to the AP node.

12. The method of claim 11, further comprising:
    assigning a new UE node to the set of UE nodes connected to the AP node to maintain a predetermined number of connected UE nodes.

13. The method of claim 9, further comprising:
    canceling interference from UE nodes not connected to the AP node by subtracting a signal corresponding to a most probable symbol transmitted by each unconnected UE node from the received signal.

14. The method of claim 9, further comprising:
    truncating a set of possible symbols for each UE node to a subset of possible symbols based on an achievable rate of the represented UE; and
    estimating a probability of each possible symbol in the subset of possible symbols for each UE node.

15. The method of claim 14, wherein truncating the set of possible symbols comprises:
    selecting the subset of possible symbols for each UE node based on a proximity of each possible symbol to a soft estimate of a transmitted symbol obtained from a minimum mean squared error (MMSE) detector.

16. The method of claim 9, further comprising:
    truncating a set of possible symbols for each UE node to a subset of possible symbols based on a bit log-likelihood ratio (LLR) of each bit of the possible symbols; and
    estimating a probability of each possible symbol in the subset of possible symbols for each UE node.

17. The method of claim 9, further comprising:
    adjusting a number of UE nodes connected to the AP node based on a predetermined maximum number of connected UE nodes and a predetermined minimum number of connected UE nodes.

18. An apparatus for wireless communication, the apparatus implementing a user equipment (UE) node representing a UE in a cell-free multiple-input multiple-output (MIMO) network, comprising:
    a memory; and
    at least one processor coupled to the memory and configured to:
    receive, from a plurality of access point (AP) nodes, a plurality of probability estimates for a plurality of possible symbols transmitted by the UE;

aggregate the plurality of probability estimates from the plurality of AP nodes to obtain a system-level probability estimate;

generate an updated plurality of probability estimates for the plurality of possible symbols based on the system-level probability estimate; and transmit, to the plurality of AP nodes, the updated plurality of probability estimates.

19. The apparatus of claim 18, wherein the UE node acts as an intermediary node to facilitate information exchange between the plurality of AP nodes in a message passing algorithm executed at a central unit.

20. The apparatus of claim 18, wherein the at least one processor is further configured to:

receive, from the plurality of AP nodes, a plurality of updated probability estimates for the plurality of possible symbols transmitted by the UE; and iteratively update the system-level probability estimate based on the plurality of updated probability estimates.

* * * * *